(12) United States Patent
Van der Schaaf

(10) Patent No.: US 12,505,177 B2
(45) Date of Patent: Dec. 23, 2025

(54) SYSTEMS AND METHODS FOR MANAGING SOFTWARE PROVISIONING BASED ON ADJUSTED USAGE CONDITIONS OF SOFTWARE ITEMS

(71) Applicant: Acronis International GmbH, Schaffhausen (CH)

(72) Inventor: Martijn Van der Schaaf, Zuidland (NL)

(73) Assignee: Acronis International GmbH, Schaffhausen (CH)

( * ) Notice: Subject to any disclaimer, the term of this patent is extended or adjusted under 35 U.S.C. 154(b) by 268 days.

(21) Appl. No.: 17/900,999

(22) Filed: Sep. 1, 2022

(65) Prior Publication Data
US 2024/0061909 A1    Feb. 22, 2024

Related U.S. Application Data

(63) Continuation-in-part of application No. 17/892,299, filed on Aug. 22, 2022.

(51) Int. Cl.
G06F 21/10    (2013.01)

(52) U.S. Cl.
CPC .................. G06F 21/105 (2013.01)

(58) Field of Classification Search
CPC ................................. G06F 21/105
See application file for complete search history.

(56) References Cited

U.S. PATENT DOCUMENTS

| | | | |
|---|---|---|---|
| 2002/0022971 A1* | 2/2002 | Tanaka | G06Q 30/04 705/26.1 |
| 2009/0158275 A1* | 6/2009 | Wang | G06F 9/5077 718/1 |
| 2014/0122707 A1* | 5/2014 | de Assuncao | H04L 41/5067 709/224 |
| 2014/0244545 A1* | 8/2014 | Tsuji | H04L 63/101 705/400 |
| 2015/0358482 A1* | 12/2015 | Schouwenburg | H04M 15/8061 455/406 |
| 2016/0062689 A1* | 3/2016 | Cherubini | G06F 3/0608 711/159 |

* cited by examiner

*Primary Examiner* — Eduardo Castilho
*Assistant Examiner* — Karlyannie M. Garcia
(74) *Attorney, Agent, or Firm* — ArentFox Schiff LLP; Michael Fainberg

(57) ABSTRACT

Disclosed herein are systems and method for managing software item access. A method may include: monitoring usage of a plurality of software items distributed over a network of computing devices; identifying a contract for the network governing the usage of the plurality of software items, wherein the contract includes a plurality of usage conditions that the network has to comply with to access the plurality of software items; determining whether a discrepancy between an adjustable usage condition of the plurality of usage conditions and the usage of the plurality of software items by the network exists; in response to determining that the discrepancy exists, generating a new usage condition based on historic usage condition parameters and the usage of the plurality of software items; updating the contract with the new usage condition; and managing access to the plurality of software items by the network based on the updated contract.

18 Claims, 4 Drawing Sheets

SYSTEMS AND METHODS FOR MANAGING SOFTWARE PROVISIONING BASED ON ADJUSTED USAGE CONDITIONS OF SOFTWARE ITEMS

CROSS-REFERENCE TO RELATED APPLICATIONS

This application is a continuation-in-part of U.S. Non-Provisional application Ser. No. 17/892,299 filed on Aug. 22, 2022, which is herein incorporated by reference.

FIELD OF TECHNOLOGY

The present disclosure relates to the field of software provisioning, and, more specifically, to systems and methods for managing software provisioning based on adjusted usage conditions of software items.

BACKGROUND

Software vendors provision software items for a broad set of customers (e.g., small to large-sized companies, individuals, universities, hospitals, etc.). Such provisioning and installation happens as scheduled events, but can also happen ad-hoc (e.g. when an end user gets a new device because a previous device has broken down or an end customer hires a new employee that gets a new device).

In ideal circumstances, such changes are communicated with the financial person or department of the software vendor so that they can update the billing numbers for that customer. In real life, however, this often does not happen or is forgotten. Because the financial department gets one purchase invoice for all consumption of such usage, they need to manually find out which customer has been using which software items. This even gets more complicated for pro-rated usage.

SUMMARY

Aspects of the disclosure describe methods and systems for managing software provisioning based on adjusted usage conditions of software items.

In an exemplary aspect, the techniques described herein relate to a method for managing software provisioning, the method including: monitoring usage of a plurality of software items distributed over a network of computing devices; identifying a contract for the network governing the usage of the plurality of software items, wherein the contract includes a plurality of usage conditions that the network has to comply with to access the plurality of software items; determining whether a discrepancy between an adjustable usage condition of the plurality of usage conditions and the usage of the plurality of software items by the network exists; in response to determining that the discrepancy with the adjustable usage condition exists, generating a new usage condition based on historic usage condition parameters and the usage of the plurality of software items; updating the contract with the new usage condition; and enabling or disabling access to the plurality of software items by the network based on the updated contract.

In some aspects, the techniques described herein relate to a method, wherein disabling the access to the plurality of software items includes: determining whether another discrepancy exists between a non-adjustable usage condition of the plurality of usage conditions and the usage of the plurality of software items by the network; in response to determining that the another discrepancy exists, disabling the access.

In some aspects, the techniques described herein relate to a method, wherein the plurality of software items are hosted on a cloud and wherein the plurality of software items includes one or more of: a software application, a software-as-a-service, a platform-as-a-service, an infrastructure-as-a-service, and a container-as-a-service.

In some aspects, the techniques described herein relate to a method, wherein the adjustable usage condition indicates a usage term period after which at least one software item is no longer accessible to the network of computing devices, and wherein determining whether the discrepancy exists includes determining that the usage term period has elapsed, and wherein the new usage condition extends the usage term period so that the discrepancy does not exist.

In some aspects, the techniques described herein relate to a method, wherein the adjustable usage condition indicates a maximum number of computing devices that can run a given software item in the network, and wherein determining whether the discrepancy exists includes determining that the maximum number has been exceeded, and wherein the new usage condition increases the maximum number of computing devices so that the discrepancy does not exist.

In some aspects, the techniques described herein relate to a method, wherein the adjustable usage condition indicates a maximum amount of software item features that can be used by a given computing device, and wherein determining whether the discrepancy exists includes determining that the maximum amount has been exceeded, and wherein the new usage condition increases the maximum amount of software item features so that the discrepancy does not exist.

In some aspects, the techniques described herein relate to a method, wherein generating the new usage condition based on the historic usage condition parameters and the usage of the plurality of software items includes: identifying a software item associated with the discrepancy; extracting, from a database including the historic usage condition parameters, contract parameters associated with the software item, wherein the contract parameters include usage conditions that have not been violated; and generating the new usage condition based on the usage conditions that have not been violated.

In some aspects, the techniques described herein relate to a method, wherein the new usage condition further matches the usage by the network such that the discrepancy is not found in the new usage condition.

In some aspects, the techniques described herein relate to a method, wherein the contract parameters are from contracts associated with different networks.

In some aspects, the techniques described herein relate to a method, wherein the contract parameters are from inactive contracts associated with the network.

It should be noted that the methods described above may be implemented in a system comprising a hardware processor. Alternatively, the methods may be implemented using computer executable instructions of a non-transitory computer readable medium.

In some aspects, the techniques described herein relate to a system for managing software provisioning, including: a memory; and a hardware processor communicatively coupled with the memory and configured to: monitor usage of a plurality of software items distributed over a network of computing devices, wherein each computing device is associated with a particular user; identify a first software item that is being actively used on a first computing device of the network; during active usage of the first software item: identify a contract for the network governing the usage of the plurality of software items, wherein the contract includes at least one usage condition that the first computing device has to comply with to access the first software item of the plurality of software items; determine whether a discrepancy between the at least one usage condition in the contract and the active usage of the first software item on the first computing device exists; and in response to determining that the discrepancy exists, adjust parameters of the active usage of the first software item on the first computing device to comply with the at least one usage condition.

In some aspects, the techniques described herein relate to a non-transitory computer readable medium storing thereon computer executable instructions for managing software provisioning, including instructions for: monitoring usage of a plurality of software items distributed over a network of computing devices, wherein each computing device is associated with a particular user; identifying a first software item that is being actively used on a first computing device of the network; during active usage of the first software item: identifying a contract for the network governing the usage of the plurality of software items, wherein the contract includes at least one usage condition that the first computing device has to comply with to access the first software item of the plurality of software items; determining whether a discrepancy between the at least one usage condition in the contract and the active usage of the first software item on the first computing device exists; and in response to determining that the discrepancy exists, adjusting parameters of the active usage of the first software item on the first computing device to comply with the at least one usage condition.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for managing software provisioning based on contracts. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
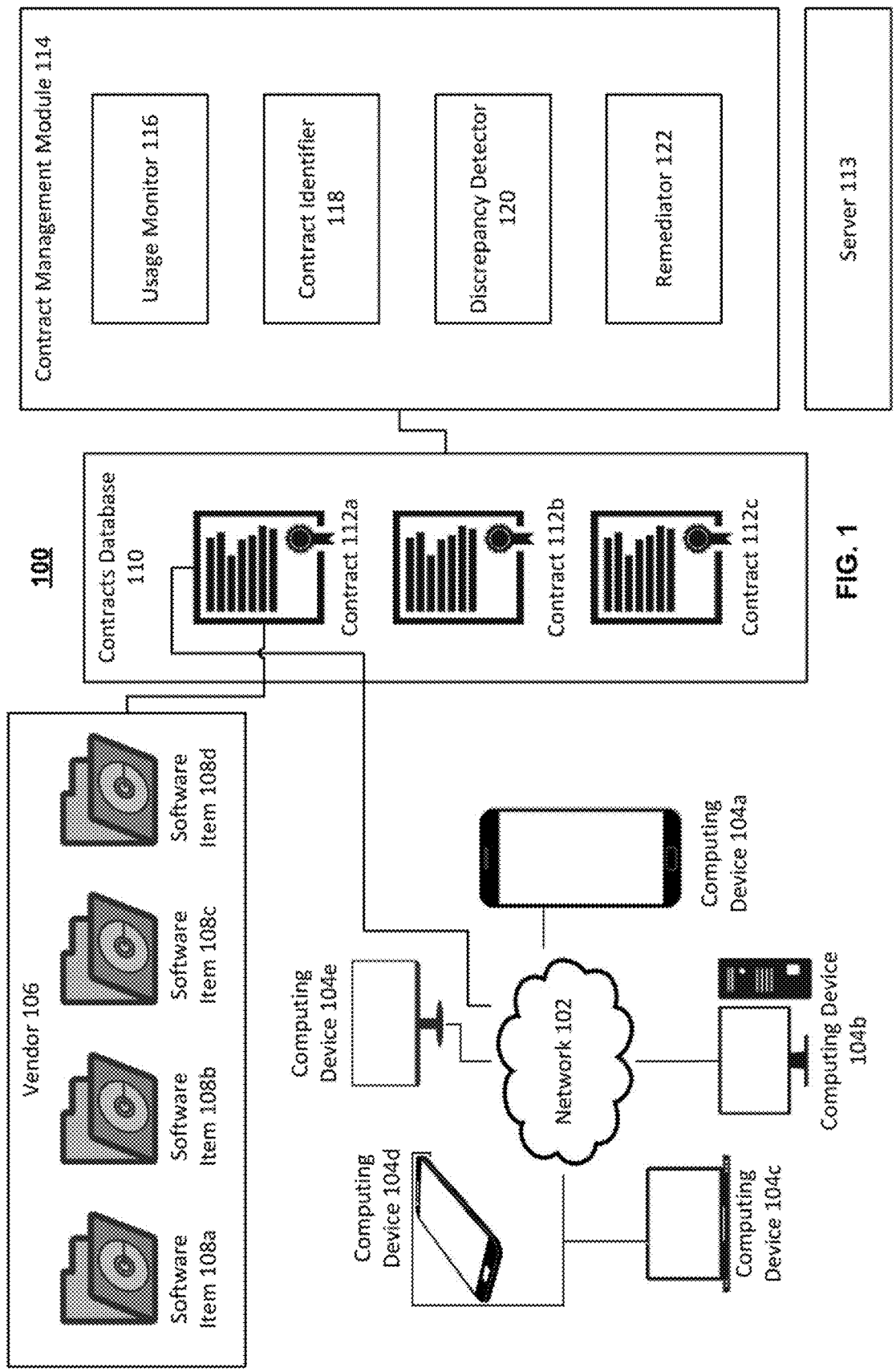
FIG. 1 is a block diagram illustrating a system for managing software provisioning based on adjusted usage conditions of software items.

FIG. 1 is a block diagram illustrating system 100 for managing software provisioning based on contracts. Consider network 102, which is connected to a plurality of computing devices 104. Network 102 may be a local area network (LAN) or a wide area network (WAN). In particular, network 102 belongs to a customer of vendor 106. The customer may be an individual, a company, a school, a university, etc. In an example where the customer is a university, computing device 104a may belong to a first user (e.g., a professor), computing device 104b may belong to a second user (e.g., a student), computing device 104c may belong to a third user (e.g., a different student), computing device 104d may belong to a fourth user (e.g., yet another student), and computing device 104e may belong to a fifth user (e.g., a dean).

Vendor 106 may offer a plurality of software items 108 to the university devices. The plurality of software items 108 may be hosted on a cloud and include one or more of: a software application, a software-as-a-service (SaaS), a platform-as-a-service (PaaS), an infrastructure-as-a-service (IaaS), and a container-as-a-service (CaaS). For example, software item 108a may a word editing software, software item 108b may be an anti-virus software, software item 108c may be a compute engine, and software item 108d may be a storage service.

Vendor 106 and the customer may generate an agreement that enables the computing devices 104 to access software items 108. This agreement has a technical form in contract 112a. Contract 112a may be stored in contracts database 110 (stored on server 113 or a separate database server) along with other contracts such as contract 112b and contract 112c. In some aspects, contracts database 110 is associated with a particular vendor 106. Accordingly, all contracts 112 are agreements between vendor 106 and a plurality of other customers and corresponding networks.

Contract 112a may indicate a plurality of usage conditions for a set of software items 108. For example, contract 112a may indicate the exact identifiers of software items that are available for use by network 102 and the exact identifiers of the computing devices that have access. Contract 112a may further indicate an amount of access a given computing device has to a given software item. For example, if software item 108d is a storage service, contract 112a may indicate that computing devices 104a, 104b, and 104d have access to cloud storage, whereas computing device 104c and 104e do not. Furthermore, contract 112a may indicate that computing devices 104a and 104b have 200 GB of storage available and computing device 104e has 1 TB of storage available. A usage condition may indicate that if a computing device exceeds the allowance of storage, then the access to the storage service by the computing device is to be terminated. Other examples of usage conditions may indicate a period of time during which the software items are available to network 102. Once the period elapses, the availability ceases. Other usage conditions may include other terms of usage such as not performing illegal actions using the software items (e.g., piracy, hacking, etc.), using the software item(s) solely within a certain location (e.g., within the country, city, neighborhood, campus grounds, etc.), not sending/providing the software item to an unauthorized user for usage, etc.

Server 113 may be a front-end web server that hosts a given software item and contract management module (CMM) 114 which takes care of creating or updating the contract line items by sending the contract line item details to the software item's API. Contract management module (CMM) 114 may be installed on server 113 as a thick client application and on a given computing device (e.g., 104a) as a thin client application. The thin client application is configured to monitor usage of a software item on the computing device. For example, if a software item is an artificial intelligence (A.I) service that enables the usage of a particular machine learning algorithm, usage monitor 116 of CMM 114 (thin version) may determine an amount of times the machine learning algorithm has been executed. This information is transmitted to usage monitor 116 of CMM 114 (thick version), which executes contract identifier 118. Contract identifier 118 determines which contract from contracts database 110 pertains to the computing device/network in question. For example, if computing device 104a is in question, contract identifier 118 may determine that contract 112a is associated with the device because contract 112a may include a reference to network 102 or an identifier of the corresponding customer. Furthermore, computing device 104a may have a unique identifier that is pre-mapped to network 102 and is written in contract 112a.

Discrepancy detector 120 of CMM 114 (thick version) may then compare the usage of the software item with the usage conditions in contract 112a. Suppose that the usage condition states that software item 108a may only be used a threshold number of times in a given time period (e.g., 10 times in one week) by computing device 104a. Accordingly, if computing device 104a executes software item 108a an $11^{th}$ time in the week, discrepancy detector 120 may detect that the usage is a discrepancy that does not comply with contract 112a. As a result, remediator 122 adjusts the parameters of the usage of software item 108a to ensure that the discrepancy is resolved.

In general, CMM 114 determines which software items are active and where they are deployed (which customer, which system, etc.). CMM 114 tracks the corresponding contracts for each customer and identifies gaps between what is consumed, and if all the consumption is being billed for. The feature that matches software item usage against the contract checks for each customer, identifies which software items are active and the quantity for each usage, finds contract line items matching those software items and the quantity for each software item in those contract line items, and find discrepancies between contract information and software item usage. In some aspects, remediator 122 sends a notification to vendor 106 and the computing device executing a software item associated with a discrepancy, wherein the notification describes the discrepancy. Remediator 122 may update the existing contract line item to match the new usage or create a new contract line item for the software item as an amendment to an existing contract based on a proposed product from the products lists (changeable by the user). In some aspects, remediator 122 may create a new contract and a new contract line item for the software item in the case that the customer does not yet have an active contract.

Figure 2:
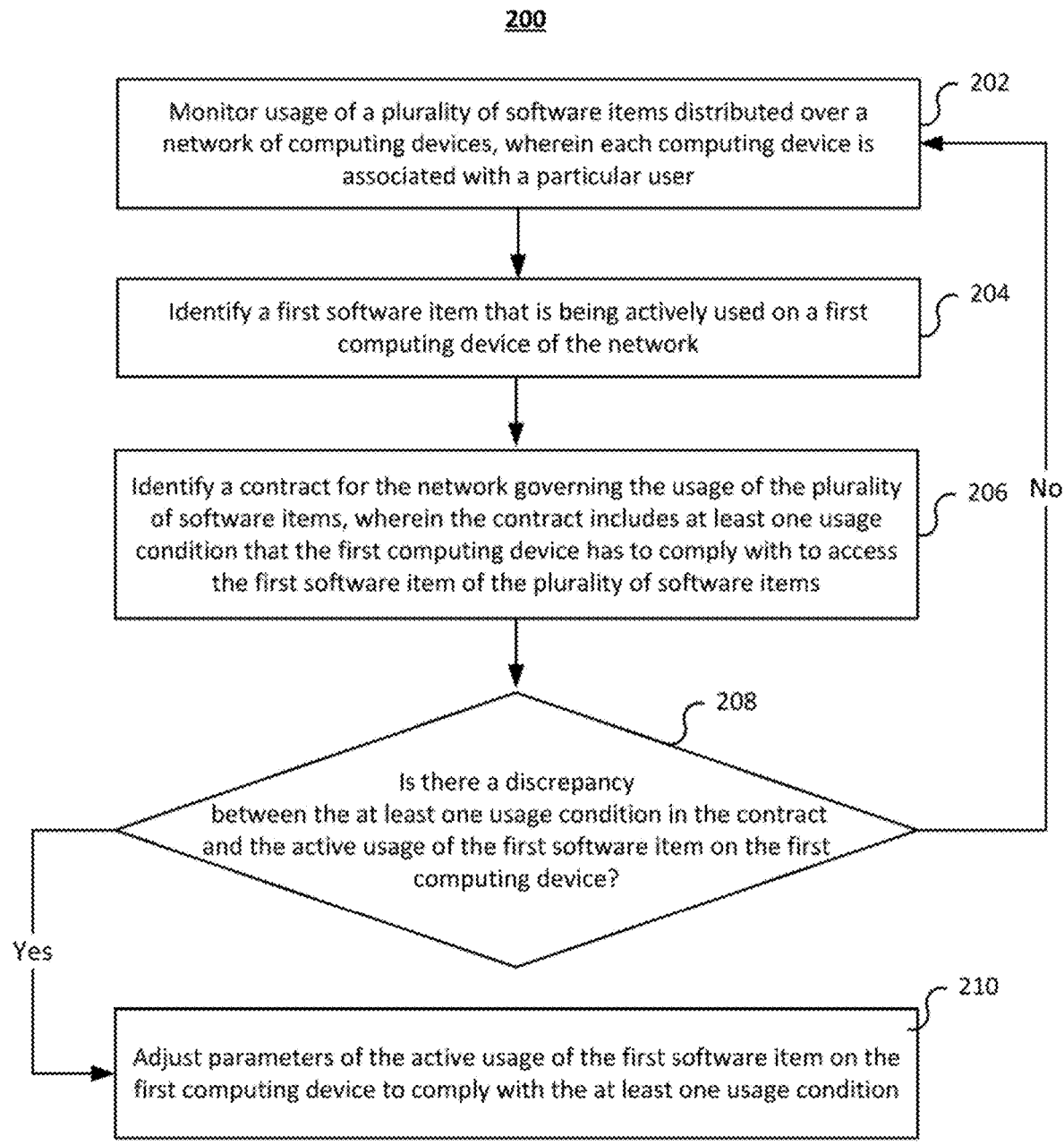
FIG. 2 illustrates a flow diagram of a method for managing software provisioning based on contracts.

FIG. 2 illustrates a flow diagram of method 200 for managing software provisioning based on contracts. At 202, usage monitor 116 monitors usage of a plurality of software items (e.g., software item 108a, software item 108b, software item 108c, and/or software item 108d) distributed over a network of computing devices (e.g., computing devices 104 of network 102), wherein each computing device is associated with a particular user. For example, usage monitor 116 may be installed on each computing device of network 102 and may collect inputs associated with any of software items 108. Suppose that computing device 104a runs software item 108d. Usage monitor 116 may receive information about the command to launch software item 108d (e.g., a timestamp, an identifier of the user requesting the launch, system state information of the computing device during the launch (battery, network connection, processor utilization)). Usage monitor 116 may subsequently collect all inputs made during access to software item 108d (e.g., read/write commands for software item 108d, setting changes, errors, etc.). In some aspects, the collected inputs are exclusive to software items being directly monitored by usage monitor 116 such that all other software unrelated to vendor 106 is not monitored. However, in some aspects, the collected inputs include commands to other software that can interact with software item 108d. For example, a contract may impose privacy conditions that prevent the content of software item 108d from being captured by other software (e.g., screenshots, screen recordings, etc.). Accordingly, the launch/usage of such software needs to be monitored in addition to software item 108d. Nonetheless, the monitoring is only performed when a software item of vendor 106 is being actively used.

At 204, usage monitor 116 identifies a first software item (e.g., software item 108c) that is being actively used on a first computing device of the network (e.g., computing device 104a). Active usage of a software item can be different based on the software item in question. In general, if a software item has been launched (manually or automatically) and is using computer resources above a threshold amount of computer resources (e.g., a threshold amount of random access memory (RAM), a threshold central processor unit (CPU) utilization, etc.), it is considered being actively used. Even if the software item is running in the background, if it is performing some functionality in the background other than being idle (under the criteria described above), the software item is considered being actively used.

At 206, during active usage of the first software item, contract identifier 118 identifies a contract for the network governing the usage of the plurality of software items, wherein the contract includes at least one usage condition that the first computing device has to comply with to access the first software item of the plurality of software items. For example, each software item 108 may have a particular software identifier and each computing device 104 may have a device identifier. These identifiers may be unique to the software items and computing devices. For example, a device identifier may be a MAC address. Contract identifier 118 may search contracts database 110 for a contract (e.g., contract 112a) that mentions both a software identifier and device identifier. Consider an example of contract 112a below:

TABLE 1

Example Contract

Contract 112a      Contract Identifier: ABC12354
Network Identifier: XYZ987654321
Computing Device Members: Computing Device 104a, Computing TABLE 1-continued Example Contract Device 104b, Computing Device 104c, Computing Device 104d
Device Identifiers: D1104A, D1104B, D1104C, D1104D
Software Item Members: Software Item 108a, Software Item 108b, Software Item 108c, Software Item 108d
Software Item Identifiers: S108A, S108B, S108C, S108D Allocations

| Device | Software Item | Price | Usage Conditions |
| --- | --- | --- | --- |
| D1104A | S108D | 200.00 | Expires on 12:00:00 on Aug. 1, 2023<br>500 GB storage maximum<br>No illegal objects to be stored |
| D1104B | S108A | 1000.00 | Expires on 12:00:00 on Aug. 1, 2023<br>1000 documents can be read<br>400 documents can be saved |
| D1104B | S108D | 400.00 | Expires on 12:00:00 on Aug. 1, 2023<br>1 TB storage maximum<br>No illegal objects to be stored |
| . . . | . . . | . . . | . . . |
| D1104D | S108C | 500.00 | Expires on 12:00:00 on Aug. 1, 2023<br>12 GB RAM, 2.5 GHz processor compute engine |

In the exemplary contract above, each device 104 has been allocated a subset of software items 108. For example, computing device 104a can access software item 108d, but no other software item. If computing device 104a attempts to access any other software item 108, the contract is breached. If computing device 104a attempts to access software item 108d such that the access does not comply with the usage conditions, the contract is breached.

At 208, discrepancy detector 120 determines whether a discrepancy between the at least one usage condition in the contract and the active usage of the first software item on the first computing device exists.

For example, the at least one usage condition may indicate a usage term period after which the first software item is no longer accessible to the first computing device, and wherein determining whether the discrepancy exists comprises determining that the usage term period has elapsed. In the example above, the usage term period is until 12:00:00 of 8/1/2023. After this point, software item 108d should not be accessible to computing device 104a unless the contract is renegotiated or a new contract is made. If access is attempted and the discrepancy is detected, remediator 122 may prevent the access.

In another example, the at least one usage condition indicates a maximum number of computing devices that can run the first software item in the network, and wherein determining whether the discrepancy exists comprises determining that the first computing device causes the maximum number to be exceeded. For example, certain contracts may be flexible and simply allow all computing devices under network 102 to access any given software item 108a (i.e., the N devices in network 102 can access software item 108d). However, as new devices are added to network 102 (e.g., new students or employees join network 102), the details in contract 112a may become outdated. Suppose that computing device 104e is a new device not mentioned in contract 112a. Software items 108 may be installed on computing device 104e by the customer. When a software item is launched, because contract 112a does not include computing device 104e, discrepancy detector 120 may determine that contract 112a has been violated (i.e., a discrepancy exists).

In yet another example, the at least one usage condition indicates a maximum amount of software item features that can be used by the first computing device, and wherein determining whether the discrepancy exists comprises determining that the first software item causes the maximum amount to be exceeded. For example, according to contract 112a, computing device 104b may access software item 108a (e.g. a word editor) such that only 1000 documents may be read. In other examples, this value may indicate the amount of times an algorithm can be used or an amount of times media may be viewed. The features that enable access to the algorithm, media, documents, etc., are limited in amount of use. If computing device 104b attempts to view the 1001th document for example, discrepancy detector 120 may detect a discrepancy.

In response to detecting a discrepancy, method 200 advances to 210, where remediator 122 adjusts parameters of the active usage of the first software item on the first computing device to comply with the at least one usage condition. If a discrepancy is not detected, method 200 returns to 202, where usage monitor 116 continues to monitor the usage of software items.

Adjusting the parameters of the usage of the first software item on the first computing device may involve disabling access to the first software item using the first computing device, disabling write abilities of the first software item on the first computing device, or disabling network functionality of the first software item on the first computing device.

The exact adjustment taken by remediator 122 depends on the software item that is being accessed. Each software item may include metadata that indicates the adjustments to make based on the usage condition potentially being violated. Remediator 122 may be preconfigured to execute the adjustments by reading the metadata. In one case, this may involve disabling a particular feature. For example, if 1000 documents have not yet been viewed by computing device 104b using software item 108a, but 400 documents have been saved already (see contract 112a above), the writing capabilities of software item 108a may be blocked on computing device 104b to solely prevent violations of the usage condition that will be violated. In another example, if a software item is storing data on the cloud, disabling network functionality will prevent access to the data on the cloud.

In some aspects, remediator 122 may adjust contract 112a to match the parameters of the active usage. For example, contract 112a may be amended or remediator 122 may generate a new contract that enables computing devices 104 to access software items 108 without any downtime (e.g., disabling features, prevention of access, etc.). Suppose that a computing device is accessing a software item after the usage time period. Remediator 122 may extend the usage time period by a certain time (e.g., 1 week) and include a new charge for the customer on behalf of vendor 106.

Suppose that a new computing device is added to network 102 and that computing device attempts to access a software item. Remediator 122 may update contract 112a or generate a new contract that includes the new computing device, enables access to the selected software item by the new computing device, sets usage conditions based on historic usage conditions agreed upon by the customer and vendor, and determines a new charge for the customer. For example, if a new computing device attempts to access software item 108d, remediator 122 may add a new line item shown below:

TABLE 2

Additional Line Item

| Device | Software Item | Price | Usage Conditions |
|---|---|---|---|
| D1104E | S108D | 200.00 | Expires on 12:00:00 on Aug. 1, 2023<br>1 TB storage maximum<br>No illegal objects to be stored |

In some aspects, if the usage conditions and price vary based on computing device, remediator 122 may compare the attributes of the new device with attributes of a computing device already on the contract, and set usage conditions based on matching attributes. For example, computing device 104e may be a new device that is a desktop computer. Computing device 104b is also a desktop computer that has access to software item 108d. Because both devices are desktop computers, the usage conditions set for computing device 104e are matched by remediator 122 with the usage conditions set for computing device 104b. This is why the line item above indicates 1 TB of storage (rather than 500 GB associated with computing device 104a (a smartphone)).

In some aspects, usage monitor 116 may determine that the first software item is being used on a second computing device of the network. Discrepancy detector 120 may determine whether a discrepancy between the at least one usage condition in the contract and usage of the first software item on the second computing device exists. In response to determining that the discrepancy exists, remediator 122 may adjust parameters of the usage of the first software item on the second computing device to comply with the at least one usage condition In some aspects, usage monitor 116 installed on a given computing device may be used to manage contracts for different vendors (not only vendor 106). For example, usage monitor 116 may identify, from a different plurality of software items (not shown in FIG. 1), a second software item that is being actively used on a first computing device. During active usage of the second software item, contract identifier 118 may identify another contract governing the usage of the different plurality of software items, wherein the another contract includes another usage condition that the first computing device has to comply with to access the second software item of the different plurality of software items. This identified contract may be related to a different vendor. In some aspects, the contract may also be stored in contracts database 110. In other aspects, the contract is stored on a different database not shown in FIG. 1. In response to determining that a discrepancy between the another usage condition in the another contract and usage of the second software item exists, remediator 122 may adjust parameters of the usage of the second software item to comply with the another usage condition. Accordingly, a single CMM 114 may manage the access between a computing device and different vendors.

Figure 3:
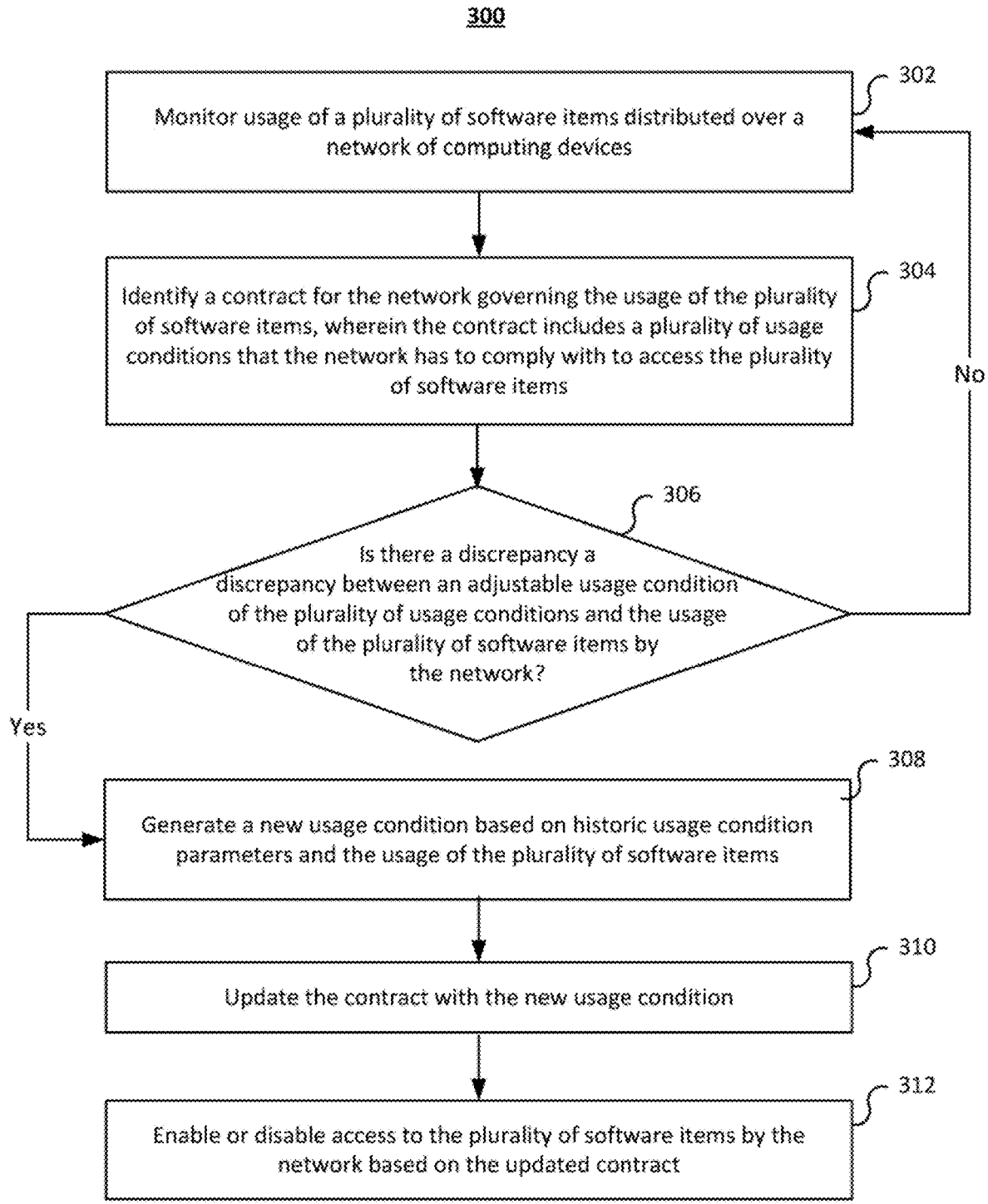
FIG. 3 illustrates a flow diagram of a method for managing software provisioning based on adjusted usage conditions of software items.

FIG. 3 illustrates a flow diagram of method 300 for managing software provisioning based on adjusted usage conditions of software items. At 302, usage monitor 116 of contract management module 114 monitors usage of a plurality of software items 108 distributed over a network of computing devices (e.g., network 102 including the plurality of computing devices 104).

At 304, contract identifier 118 identifies a contract (e.g., contract 112a) for the network governing the usage of the plurality of software items as discussed before. The contract may include a plurality of usage conditions that the network has to comply with to access the plurality of software items. In some aspects, the contract may have adjustable conditions and non-adjustable conditions. An adjustable condition is a condition that can be automatically changed by a vendor and/or customer after a contract has been generated. A non-adjustable condition cannot be changed after the contract has been generated. Furthermore, a non-adjustable condition cannot be overridden by a newly added condition. For example, if a non-adjustable condition prevents software item 108a from being accessed by an unauthorized user, a new user cannot simply override the condition or introduce a new one that enables the access (i.e., contradicting the non-adjustable condition). Non-adjustable conditions are generally set to prevent security issues, privacy loss, illegal behavior, and malpractice. The classification of a condition as "adjustable" and "non-adjustable" may be determined by vendor 106 and/or a customer associated with network 102. For example, the contract may be:

TABLE 3

Adjustable Usage Conditions and Non-adjustable Usage Conditions

Contract 112a                                  Contract Identifier: ABC12354
Network Identifier: XYZ987654321
Computing Device Members: Computing Device 104a, Computing Device 104b, Computing Device 104c, Computing Device 104d
Device Identifiers: D1104A, D1104B, D1104C, D1104D
Software Item Members: Software Item 108a, Software Item 108b, Software Item 108c, Software Item 108d
Software Item Identifiers: S108A, S108B, S108C, S108D

| | | Allocations | |
|---|---|---|---|
| Device | Software Item | Price | Usage Conditions |
| D1104A | S108D | 200.00 | Expires on 12:00:00 on Aug. 1, 2023 [ADJUSTABLE]<br>500 GB storage maximum [ADJUSTABLE]<br>No illegal objects to be stored [NON-ADJUSTABLE] |
| D1104B | S108A | 1000.00 | Expires on 12:00:00 on Aug. 1, 2023 [ADJUSTABLE]<br>1000 documents can be read [ADJUSTABLE]<br>400 documents can be saved [ADJUSTABLE] |
| D1104B | S108D | 400.00 | Expires on 12:00:00 on Aug. 1, 2023 [ADJUSTABLE]<br>1 TB storage maximum [ADJUSTABLE]<br>No illegal objects to be stored [NON-ADJUSTABLE] |
| . . . | . . . | . . . | . . . |
| D1104D | S108C | 500.00 | Expires on 12:00:00 on Aug. 1, 2023 [ADJUSTABLE]<br>12 GB RAM, 2.5 GHz processor compute engine [NON-ADJUSTABLE] |

At 306, discrepancy detector 120 determines whether a discrepancy between an adjustable usage condition of the plurality of usage conditions and the usage of the plurality of software items by the network exists. In response to determining that the discrepancy with the adjustable usage condition exists, method 300 advances to 308, where remediator 122 generates a new usage condition based on historic usage condition parameters and the usage of the plurality of software items. Otherwise, method 300 returns to 302, where contract management module 114 further monitors the usage of software items by the network.

In some aspects, generating the new usage condition involves identifying a software item associated with the discrepancy and extracting, from a database comprising the historic usage condition parameters in server 113, contract parameters associated with the software item. These contract parameters include usage conditions that have not been violated. The new usage conditions is created based on those usage conditions. For example, suppose that software item 108d is a storage service that enables computing device 104a to store up to 500 GB of data according to contract 112a. The maximum storage space is an adjustable usage condition. Suppose that computing device 104a is attempting to upload a file for storage and the file will cause the storage maximum of 500 GB to be exceeded. Discrepancy detector 120 may determine that the uploading action will cause the adjustable usage condition to be broken. The only way to rectify the situation is to increase the maximum allocation. However, because there are costs associated with increases and payment structures that may prevent increases to arbitrary sizes, remediator 122 may assess how historically software item 108d has been utilized. Suppose that a search for usage conditions associated with software item 108d yields the following results:

TABLE 4

Search in Historic Usage Condition Parameters Database

| Software Item | Time | Condition | Status |
|---|---|---|---|
| S108D | Aug. 1, 2022 10:00:22 | 500 GB storage maximum | Violation |
| S108D | Jan. 20, 2022 9:02:34 | 250 GB storage maximum | Violation |
| S108D | Jul. 12, 2020 13:11:45 | 750 GB storage maximum | No violation |
| ... | ... | ... | ... |
| S108D | May 9, 2019 20:54:10 | 1 TB storage maximum | No violation |

In some aspects, the results above are contract parameters from inactive contracts associated with the network. For example, contracts 112b and 112c may be inactive contracts representing transactions that have expired or elapsed. An inactive contract may no longer be monitored by contract management module 114 due to an expiration or a successful completion of a service. In an exemplary aspect, remediator 122 may generate the new usage condition based on the usage conditions that have not been violated. In particular, remediator 122 confirms that the new usage condition does not cause a violation with the monitored usage by the network. Based on the results, the lowest maximum amount where no violation was detected is 750 GB. Although no violation was detected at 1 TB either, because an objective is to reduce the financial burden of the automatic adjustment, the next highest maximum amount from 500 GB is selected. Remediator 122 then sets the new usage condition as "750 GB storage maximum." In some aspects, remediator 122 may remove the original adjustable usage condition and place the new usage condition in its place. Remediator 122 may further determine the price associated with the new usage condition (e.g., the increase of 250 GB may cost an addition $50), and update contract 112a accordingly at 310. For example, a portion of contract 112a shown in table 3 may become:

TABLE 5

Updated Contract with New Usage Condition

| Device | Software Item | Price | Usage Conditions |
|---|---|---|---|
| D1104A | S108D | ~~200.00~~ 250.00 | Expires on 12:00:00 on Aug. 1, 2023 [ADJUSTABLE] ~~500 GB storage maximum [ADJUSTABLE]~~ No illegal objects to be stored [NON-ADJUSTABLE] 750 GB storage maximum [ADJUSTABLE] |

Subsequent to updating the contract with the new usage condition, at 312, contract management module 114 may enable or disable access to the plurality of software items by the network based on the updated contract. The enabling and/or disabling can be performed using the criteria described previously.

For example, disabling the access to the plurality of software items may include determining whether another discrepancy exists between a non-adjustable usage condition of the plurality of usage conditions and the usage of the plurality of software items by the network. In response to determining that the another discrepancy exists, remediator 122 may disable the access. For example, referring to table 5, a non-adjustable usage condition states that software item 108d cannot be used to stored illegal objects. Suppose that discrepancy detector 120 determines that a pirated media file (e.g., a movie) has been stored in the storage service (e.g., an attribute in the metadata of the file may indicate a suspicious source or author in a blacklist managed by discrepancy detector 120). Because the storage of the media file violates the non-adjustable condition, remediator 122 may disable access to software item 108d by computing device 104a.

In another example, software item 108c may be a computing service that provides access to a 12 GB RAM, 2.5 GHz processor compute engine (as seen in table 3). There may be a non-adjustable usage condition that prevents the compute engine's attributes from being altered or tampered with. If the attributes are somehow adjusted maliciously by computing device 104d with the introduction of an encryption-based malware, discrepancy detector 120 may disable access to software item 108c by computing device 104d.

In terms of other adjustable usage conditions that discrepancy detector 120 may monitor for, an adjustable usage condition may indicate a maximum number (e.g., five) of computing devices that can run a given software item in the network. For example, only five devices may have access to software item 108a. If network 102 introduces a new device and installs software item 108a on the device, discrepancy detector 120 may determine that the maximum number has been exceeded. In response, remediator 122 may generate a new usage condition that increases the maximum number of computing devices so that the discrepancy does not exist (e.g., an increase from 5 to 6). Remediator 122 may also update the pricing in contract 112a to account for the increase in allowance.

In another example, the adjustable usage condition indicates a maximum amount of software item features that can be used by a given computing device. For example, a given software item may have multiple tiers in features. A first tier may provide access to a first subset of features. A second tier may provide access to a larger subset of features and a final tier may provide access to all features. A given computing device may be contractually entitled to the first tier of features only. However, a user may attempt to access a feature in the second tier. Accordingly, remediator 122 may create a new usage condition that enables access to the additional features.

In another example, a computing device may only be able to access a certain feature of a software item a specific number of times contractually. If the computing device attempts to access the feature more than that number of times, remediator 122 may replace the corresponding adjustable usage condition with a new usage condition that allows additional access to the feature.

In another example, an adjustable usage condition may limit the amount of time a computing device has access to a software item. Remediator 122 may extend the amount of time in a new usage condition.

As discussed previously, historic contract condition parameters are used by remediator 122 to make new usage conditions and resolve discrepancies. Remediator 122 confirms that the discrepancy will be resolved by the new usage condition and that the increase in price will not be more than required. For example, if the amount of time until access to a software item is set to expire is reached, remediator 122 may extend the time indefinitely or for several years, and that may incur a high financial cost. However, remediator 122 instead finds usage conditions in the database of historical usage condition parameters to identify the next lowest amount of time for an extension (i.e., if the deal is 1 year, the new usage condition may extend by 1 year). Historic usage condition parameters provide insights to what customers are comfortable with. For example, if a customer usually makes monthly extensions, a yearly extension may not be suitable for them. Accordingly, remediator 122 will extend by a month using the new usage condition.

In some cases there may be a lack of historic usage condition parameters in the database for a given network. For example, network 102 may be associated with a university that has just recently become a customer of vendor 106 (contract 112a may be the first contract). When looking for a reference usage condition, if the results from the historic usage database do not yield conditions that will resolve a discrepancy, discrepancy detector 120 may determine a network type of network 102. A network type may be a class with which the customer can be identified. Example network types may include, but are not limited to, university, financial institution, sports organization, non-profit organization, hospital, etc. Subsequent to identifying the network type, discrepancy detector 120 may search the historic usage condition databases of networks of the same network type. For example, discrepancy detector 120 may retrieve the historic usage condition parameters of a different university. Because the network types are the same, the usage habits and behaviors between the organizations may be comparable. Discrepancy detector 120 may identify the cheapest usage condition in the historical usage condition parameters that can resolve the discrepancy and set that as the new usage condition in place of an adjustable usage condition in contract 112a.

Figure 4:
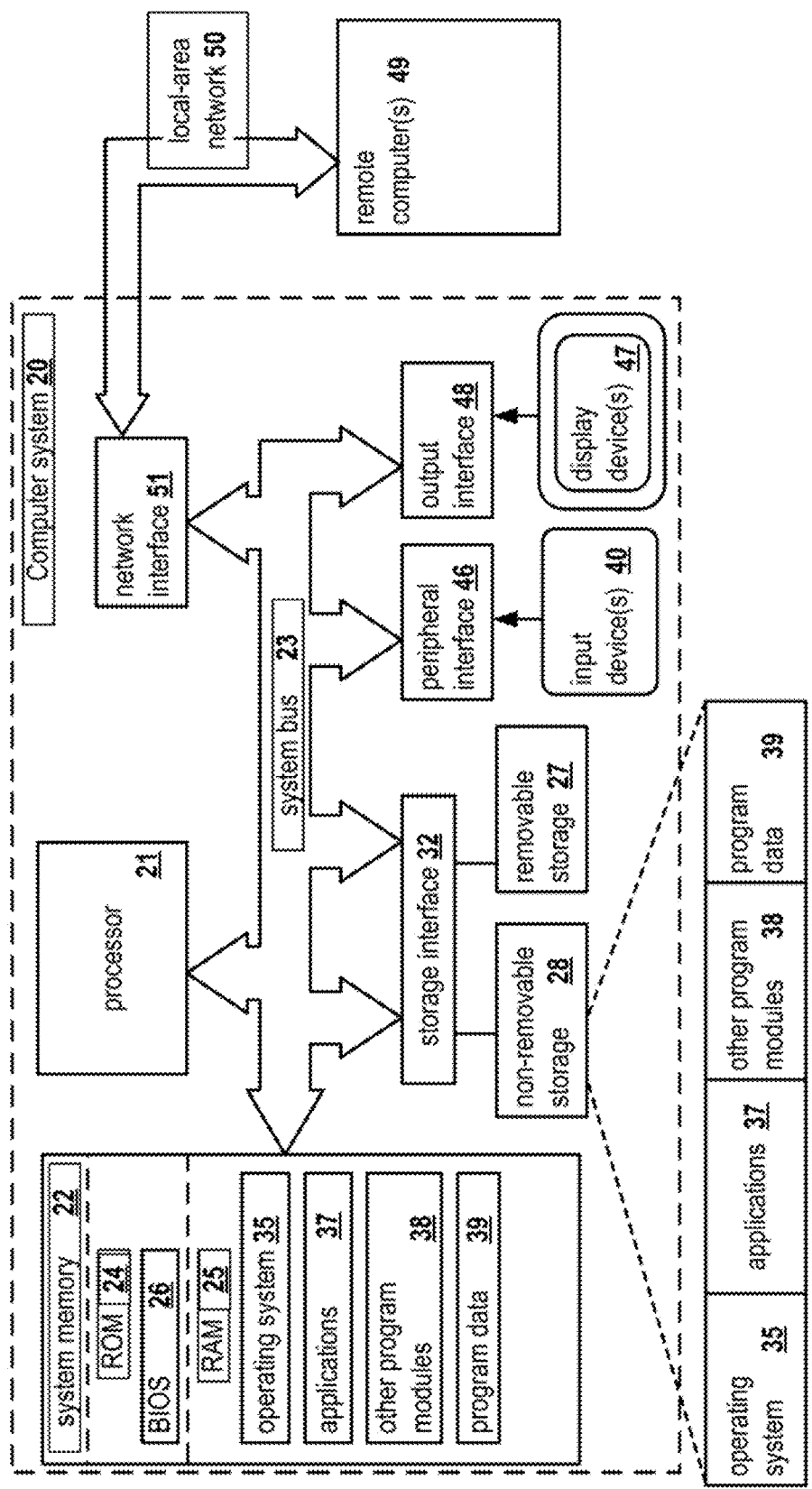
FIG. 4 presents an example of a general-purpose computer system on which aspects of the present disclosure can be implemented.

FIG. 4 is a block diagram illustrating a computer system 20 on which aspects of systems and methods for managing software provisioning based on adjusted usage conditions of software items may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter.

In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for software provisioning by a contract management module (CMM) installed on a server as a thick client application and on a network of computing devices as thin client applications, the method comprising:
monitoring, by the thin client applications installed on the network of computing devices, usage of a plurality of software items distributed over the network of computing devices;
reporting, by the thin client applications installed on the network of computing devices to the thick client application installed on the server, usage of the plurality of software items distributed over the network of computing devices;
identifying, by the thick client application installed on the server, in a database of contracts stored on the server or on a separate database server, a contract for the network governing the usage of the plurality of software items, wherein the contract includes a plurality of usage conditions that the network has to comply with to access the plurality of software items;
determining, by the thick client application installed on the server, whether a discrepancy between an adjustable usage condition of the plurality of usage conditions in the contract and the usage of the plurality of software items by the network exists;
in response to determining that the discrepancy with the adjustable usage condition in the contract exists:
determining, by the thick client application installed on the server, whether historic usage condition parameters, which are from inactive contracts of the network representing transactions that have expired or completed, include usage conditions that can resolve the discrepancy;
in response to determining that the historic usage condition parameters associated with the network do not include usage conditions that can resolve the discrepancy, identifying a first network type of the network; and
retrieving, from a historic usage conditions database, additional historic usage condition parameters associated with a different network with a second network type that matches the first network type;
generating, by the thick client application installed on the server, a new usage condition based on the additional historic usage condition parameters and the usage of the plurality of software items by the network, wherein the adjustable usage condition indicates a maximum amount of software item features that can be used by a given computing device, and wherein determining whether the discrepancy exists comprises determining that the maximum amount has been exceeded, and wherein the new usage condition increases the maximum amount of software item features so that the discrepancy does not exist;
updating, by the thick client application installed on the server, the contract with the new usage condition; and
enabling or disabling, by the thick client application installed on the server, access to the plurality of software items by the network based on the updated contract.

2. The method of claim 1, wherein disabling the access to the plurality of software items comprises:
determining whether another discrepancy exists between a non-adjustable usage condition of the plurality of usage conditions and the usage of the plurality of software items by the network; and
in response to determining that the another discrepancy exists, disabling the access.

3. The method of claim 1, wherein the plurality of software items are hosted on a cloud and wherein the plurality of software items includes one or more of: a software application, a software-as-a-service, a platform-as-a-service, an infrastructure-as-a-service, and a container-as-a-service.

4. The method of claim 1, wherein the adjustable usage condition indicates a usage term period after which at least one software item is no longer accessible to the network of computing devices, and wherein determining whether the discrepancy exists comprises determining that the usage term period has elapsed, and wherein the new usage condition extends the usage term period so that the discrepancy does not exist.

5. The method of claim 1, wherein the adjustable usage condition indicates a maximum number of computing devices that can run a given software item in the network, and wherein determining whether the discrepancy exists comprises determining that the maximum number has been exceeded, and wherein the new usage condition increases the maximum number of computing devices so that the discrepancy does not exist.

6. The method of claim 1, wherein generating the new usage condition based on the historic usage condition parameters and the usage of the plurality of software items comprises:
identifying a software item associated with the discrepancy;
extracting, from a database comprising the historic usage condition parameters, contract parameters associated with the software item, wherein the contract parameters include usage conditions that have not been violated; and
generating the new usage condition based on the usage conditions that have not been violated.

7. The method of claim 6, wherein the new usage condition further matches the usage by the network such that the discrepancy is not found in the new usage condition.

8. The method of claim 6, wherein the contract parameters are from contracts associated with different networks.

9. The method of claim 6, wherein the contract parameters are from inactive contracts associated with the network.

10. A system for software provisioning by a contract management module (CMM) installed on a server as a thick client application and on a network of computing devices as thin client applications, comprising:
a memory; and
a hardware processor communicatively coupled with the memory and configured to:
monitor, by the thin client applications installed on the network of computing devices, usage of a plurality of software items distributed over the network of computing devices;
report, by the thin client applications installed on the network of computing devices to the thick client application installed on the server, usage of the plurality of software items distributed over the network of computing devices;
identify, by the thick client application installed on the server, in a database of contracts stored on the server or on a separate database server, a contract for the network governing the usage of the plurality of software items, wherein the contract includes a plurality of usage conditions that the network has to comply with to access the plurality of software items;

determine, by the thick client application installed on the server, whether a discrepancy between an adjustable usage condition of the plurality of usage conditions in the contract and the usage of the plurality of software items by the network exists;

in response to determining that the discrepancy with the adjustable usage condition in the contract exists:

determine, by the thick client application installed on the server, whether historic usage condition parameters, which are from inactive contracts of the network representing transactions that have expired or completed, include usage conditions that can resolve the discrepancy;

in response to determining that the historic usage condition parameters associated with the network do not include usage conditions that can resolve the discrepancy, identify a first network type of the network; and retrieve, from a historic usage conditions database, additional historic usage condition parameters associated with a different network with a second network type that matches the first network type;

generate, by the thick client application installed on the server, a new usage condition based on the additional historic usage condition parameters and the usage of the plurality of software items by the network, wherein the adjustable usage condition indicates a maximum amount of software item features that can be used by a given computing device, and wherein determining whether the discrepancy exists comprises determining that the maximum amount has been exceeded, and wherein the new usage condition increases the maximum amount of software item features so that the discrepancy does not exist;

update, by the thick client application installed on the server, the contract with the new usage condition; and enable or disable, by the thick client application installed on the server, access to the plurality of software items by the network based on the updated contract.

11. The system of claim 10, wherein the hardware processor is configured to disable the access to the plurality of software items by:

determining whether another discrepancy exists between a non-adjustable usage condition of the plurality of usage conditions and the usage of the plurality of software items by the network; and in response to determining that the another discrepancy exists, disabling the access.

12. The system of claim 10, wherein the plurality of software items are hosted on a cloud and wherein the plurality of software items includes one or more of: a software application, a software-as-a-service, a platform-as-a-service, an infrastructure-as-a-service, and a container-as-a-service.

13. The system of claim 10, wherein the adjustable usage condition indicates a usage term period after which at least one software item is no longer accessible to the network of computing devices, and wherein determining whether the discrepancy exists comprises determining that the usage term period has elapsed, and wherein the new usage condition extends the usage term period so that the discrepancy does not exist.

14. The system of claim 10, wherein the adjustable usage condition indicates a maximum number of computing devices that can run a given software item in the network, and wherein determining whether the discrepancy exists comprises determining that the maximum number has been exceeded, and wherein the new usage condition increases the maximum number of computing devices so that the discrepancy does not exist.

15. The system of claim 10, wherein the hardware processor is configured to generate the new usage condition based on the historic usage condition parameters and the usage of the plurality of software items by:

identifying a software item associated with the discrepancy;

extracting, from a database comprising the historic usage condition parameters, contract parameters associated with the software item, wherein the contract parameters include usage conditions that have not been violated; and generating the new usage condition based on the usage conditions that have not been violated.

16. The system of claim 15, wherein the new usage condition further matches the usage by the network such that the discrepancy is not found in the new usage condition.

17. The system of claim 15, wherein the contract parameters are from contracts associated with different networks.

18. A non-transitory computer readable medium storing thereon computer executable instructions for software provisioning by a contract management module (CMM) installed on a server as a thick client application and on a network of computing devices as thin client applications, including instructions for:

monitoring, by the thin client applications installed on the network of computing devices, usage of a plurality of software items distributed over the network of computing devices;

reporting, by the thin client applications installed on the network of computing devices to the thick client application installed on the server, usage of the plurality of software items distributed over the network of computing devices;

identifying, by the thick client application installed on the server, in a database of contracts stored on the server or on a separate database server, a contract for the network governing the usage of the plurality of software items, wherein the contract includes a plurality of usage conditions that the network has to comply with to access the plurality of software items;

determining, by the thick client application installed on the server, whether a discrepancy between an adjustable usage condition of the plurality of usage conditions in the contract and the usage of the plurality of software items by the network exists;

in response to determining that the discrepancy with the adjustable usage condition in the contract exists:

determining, by the thick client application installed on the server, whether historic usage condition parameters, which are from inactive contracts of the network representing transactions that have expired or completed, include usage conditions that can resolve the discrepancy;

in response to determining that the historic usage condition parameters associated with the network do not include usage conditions that can resolve the discrepancy, identifying a first network type of the network; and retrieving, from a historic usage conditions database, additional historic usage condition parameters associated with a different network with a second network type that matches the first network type;

generating, by the thick client application installed on the server, a new usage condition based on the additional historic usage condition parameters and the usage of the plurality of software items by the network, wherein the adjustable usage condition indicates a maximum amount of software item features that can be used by a given computing device, and wherein determining whether the discrepancy exists comprises determining that the maximum amount has been exceeded, and wherein the new usage condition increases the maximum amount of software item features so that the discrepancy does not exist;

updating, by the thick client application installed on the server, the contract with the new usage condition; and enabling or disabling, by the thick client application installed on the server, access to the plurality of software items by the network based on the updated contract.

* * * * *